(12) United States Patent
Macken et al.

(10) Patent No.: US 8,793,398 B2
(45) Date of Patent: Jul. 29, 2014

(54) FACILITATING CLIENT SERVER INTERACTION

(75) Inventors: Luke J. Macken, Westford, MA (US);
Toshio E. Kuratomi, Granite Bay, CA (US)

(73) Assignee: Red Hat, Inc., Raleigh, NC (US)

( * ) Notice: Subject to any disclaimer, the term of this patent is extended or adjusted under 35 U.S.C. 154(b) by 798 days.

(21) Appl. No.: 12/201,330

(22) Filed: Aug. 29, 2008

(65) Prior Publication Data
US 2010/0057937 A1    Mar. 4, 2010

(51) Int. Cl.
G06F 15/16 (2006.01)
H04L 29/06 (2006.01)
H04L 29/08 (2006.01)
G06F 17/30 (2006.01)

(52) U.S. Cl.
CPC ............ *H04L 69/08* (2013.01); *H04L 67/2823* (2013.01); *H04L 67/02* (2013.01); *G06F 17/30893* (2013.01); *G06F 17/30569* (2013.01)
USPC ........... 709/246; 709/203; 709/231; 709/237; 709/218; 709/219; 370/311

(58) Field of Classification Search
None
See application file for complete search history.

(56) References Cited

U.S. PATENT DOCUMENTS

| | | | |
|---|---|---|---|
| 5,754,774 A * | 5/1998 | Bittinger et al. | 709/203 |
| 5,778,384 A * | 7/1998 | Provino et al. | 1/1 |
| 5,903,720 A * | 5/1999 | Stokes | 726/4 |
| 5,905,438 A * | 5/1999 | Weiss et al. | 340/636.1 |
| 5,926,636 A * | 7/1999 | Lam et al. | 719/313 |
| 5,969,967 A * | 10/1999 | Aahlad et al. | 700/2 |
| 6,012,098 A | 1/2000 | Bayeh et al. | |
| 6,023,698 A | 2/2000 | Lavey, Jr. et al. | |
| 6,064,977 A * | 5/2000 | Haverstock et al. | 705/9 |
| 6,085,198 A * | 7/2000 | Skinner et al. | 1/1 |
| 6,092,114 A | 7/2000 | Shaffer et al. | |
| 6,151,624 A * | 11/2000 | Teare et al. | 709/217 |
| 6,308,212 B1 * | 10/2001 | Besaw et al. | 709/228 |
| 6,397,253 B1 | 5/2002 | Quinlan et al. | |
| 6,460,141 B1 * | 10/2002 | Olden | 726/4 |
| 6,473,759 B1 * | 10/2002 | Herrendoerfer et al. | 1/1 |
| 6,549,918 B1 * | 4/2003 | Probert et al. | 1/1 |
| 6,604,106 B1 * | 8/2003 | Bodin et al. | 1/1 |
| 6,687,745 B1 * | 2/2004 | Franco et al. | 709/219 |
| 6,927,588 B1 | 8/2005 | Snelgrove | |
| 7,089,583 B2 * | 8/2006 | Mehra et al. | 726/3 |

(Continued)

OTHER PUBLICATIONS

Final Office Action; mailed Mar. 24, 2010; U.S. Appl. No. 12/201,306.

(Continued)

*Primary Examiner* — Ian N Moore
*Assistant Examiner* — Dung B Huynh
(74) *Attorney, Agent, or Firm* — Lowenstein Sandler LLP

(57) ABSTRACT

The apparatus includes a base client module and a server module. The base client module receives requests from a client application on a client computer. The base client module calls a resource of a web application. A server module transparently interacts with the logic of the web application to obtain the requested data and sends it back to the base client in a format handled by the base client. The base client can then reformat the data to a client application requested format before passing the data to the client application. This method allows a client application programmer to obtain easily usable data from a web application by using the base client.

14 Claims, 3 Drawing Sheets

(56) References Cited

U.S. PATENT DOCUMENTS

| | | | |
|---|---|---|---|
| 7,103,627 B2* | 9/2006 | Kittredge et al. | 709/201 |
| 7,185,368 B2 | 2/2007 | Copeland, III | |
| 7,296,022 B2 | 11/2007 | Harjanto | |
| 7,296,076 B1 | 11/2007 | Portolani | |
| 7,318,083 B2* | 1/2008 | Senda | 709/203 |
| 7,321,918 B2* | 1/2008 | Burd et al. | 709/203 |
| 7,366,777 B2 | 4/2008 | Hill et al. | |
| 7,505,795 B1* | 3/2009 | Lim et al. | 455/574 |
| 7,506,072 B2 | 3/2009 | Waldorf et al. | |
| 7,627,818 B2* | 12/2009 | Hays | 715/269 |
| 7,640,348 B2* | 12/2009 | Atwal et al. | 709/229 |
| 8,260,934 B2* | 9/2012 | Sigal | 709/227 |
| 2001/0005848 A1* | 6/2001 | Haverstock et al. | 707/1 |
| 2001/0009016 A1* | 7/2001 | Hofmann et al. | 709/219 |
| 2001/0032273 A1* | 10/2001 | Cheng | 709/249 |
| 2001/0034782 A1* | 10/2001 | Kinkade | 709/219 |
| 2001/0037404 A1 | 11/2001 | Hafsteinsson et al. | |
| 2001/0047427 A1* | 11/2001 | Lansio et al. | 709/238 |
| 2002/0038340 A1* | 3/2002 | Whipple et al. | 709/203 |
| 2002/0046279 A1* | 4/2002 | Chung | 709/227 |
| 2002/0056006 A1* | 5/2002 | Vange et al. | 709/235 |
| 2002/0091798 A1* | 7/2002 | Joshi et al. | 709/219 |
| 2002/0099738 A1* | 7/2002 | Grant | 707/513 |
| 2002/0103818 A1* | 8/2002 | Amberden | 707/205 |
| 2002/0107875 A1* | 8/2002 | Seliger et al. | 707/200 |
| 2002/0183045 A1* | 12/2002 | Emmerson et al. | 455/412 |
| 2002/0194380 A1 | 12/2002 | Sullivan et al. | |
| 2002/0198985 A1* | 12/2002 | Fraenkel et al. | 709/224 |
| 2003/0004874 A1* | 1/2003 | Ludwig et al. | 705/40 |
| 2003/0009476 A1* | 1/2003 | Fomenko et al. | 707/103 R |
| 2003/0048296 A1* | 3/2003 | Cullen et al. | 345/744 |
| 2003/0061404 A1* | 3/2003 | Atwal et al. | 709/328 |
| 2003/0070006 A1* | 4/2003 | Nadler et al. | 709/330 |
| 2003/0191803 A1* | 10/2003 | Chinnici et al. | 709/203 |
| 2003/0233466 A1* | 12/2003 | Kinkade | 709/232 |
| 2004/0049571 A1* | 3/2004 | Johnson et al. | 709/224 |
| 2004/0081170 A1* | 4/2004 | Schinazi | 370/395.52 |
| 2004/0088140 A1* | 5/2004 | O'Konski et al. | 702/183 |
| 2004/0088571 A1 | 5/2004 | Jerrim et al. | |
| 2004/0138964 A1* | 7/2004 | Okada et al. | 705/27 |
| 2004/0181537 A1* | 9/2004 | Chawla et al. | 707/100 |
| 2004/0260806 A1* | 12/2004 | Martin et al. | 709/224 |
| 2005/0005141 A1* | 1/2005 | Nagai et al. | 713/193 |
| 2005/0015585 A1* | 1/2005 | Kurose | 713/155 |
| 2005/0183061 A1 | 8/2005 | Papanikolaou et al. | |
| 2005/0198648 A1 | 9/2005 | Wray et al. | |
| 2005/0253851 A1* | 11/2005 | Tsukamoto | 345/473 |
| 2006/0015512 A1* | 1/2006 | Alon et al. | 707/100 |
| 2006/0041685 A1* | 2/2006 | Bracewell et al. | 709/246 |
| 2006/0041896 A1* | 2/2006 | Yagi | 719/330 |
| 2006/0047780 A1 | 3/2006 | Patnude | |
| 2006/0112399 A1* | 5/2006 | Lessly | 719/318 |
| 2006/0149746 A1* | 7/2006 | Bansod et al. | 707/10 |
| 2006/0155682 A1* | 7/2006 | Lection et al. | 707/3 |
| 2006/0168139 A1* | 7/2006 | Messinger et al. | 709/219 |
| 2006/0206559 A1 | 9/2006 | Xie et al. | |
| 2006/0251233 A1* | 11/2006 | Mott | 379/203.01 |
| 2007/0014260 A1* | 1/2007 | Seo | 370/331 |
| 2007/0016639 A1 | 1/2007 | Mukundan et al. | |
| 2007/0220115 A1* | 9/2007 | Srinivasan et al. | 709/219 |
| 2007/0256003 A1* | 11/2007 | Wagoner et al. | 715/501.1 |
| 2007/0293212 A1* | 12/2007 | Quon et al. | 455/420 |
| 2008/0034441 A1* | 2/2008 | Saha et al. | 726/27 |
| 2008/0059187 A1* | 3/2008 | Roitblat et al. | 704/257 |
| 2008/0065605 A1* | 3/2008 | Bourland et al. | 707/3 |
| 2008/0114739 A1* | 5/2008 | Hayes | 707/3 |
| 2008/0140722 A1* | 6/2008 | Jakobovits | 707/104.1 |
| 2008/0147875 A1 | 6/2008 | Stapels | |
| 2008/0201234 A1* | 8/2008 | Castro et al. | 705/26 |
| 2008/0201338 A1* | 8/2008 | Castro et al. | 707/100 |
| 2008/0209348 A1* | 8/2008 | Grechanik et al. | 715/762 |
| 2008/0228983 A1* | 9/2008 | Nishihara | 710/303 |
| 2008/0281898 A1* | 11/2008 | Pesce et al. | 709/201 |
| 2008/0294515 A1* | 11/2008 | Rupp | 705/14 |
| 2008/0313660 A1 | 12/2008 | Malik et al. | |
| 2009/0006614 A1* | 1/2009 | Le et al. | 709/224 |
| 2009/0063619 A1 | 3/2009 | Chijiiwa | |
| 2009/0150905 A1* | 6/2009 | Lin et al. | 719/313 |
| 2009/0171790 A1* | 7/2009 | Nagarajayya | 705/14 |
| 2009/0171922 A1* | 7/2009 | Adderly et al. | 707/4 |
| 2009/0183227 A1 | 7/2009 | Isaacs et al. | |
| 2009/0199210 A1* | 8/2009 | Smith, Jr. | 719/315 |
| 2009/0228440 A1* | 9/2009 | Leff et al. | 707/3 |
| 2009/0228490 A1* | 9/2009 | Faenger | 707/10 |
| 2009/0240698 A1* | 9/2009 | Shukla et al. | 707/10 |
| 2009/0259551 A1* | 10/2009 | Chenard et al. | 705/14.55 |
| 2009/0271690 A1* | 10/2009 | Iglesias | 715/200 |
| 2009/0307300 A1* | 12/2009 | Guedalia et al. | 709/202 |
| 2010/0049720 A1* | 2/2010 | Sharp et al. | 707/10 |
| 2010/0057834 A1 | 3/2010 | Macken et al. | |
| 2010/0087255 A1* | 4/2010 | Kniberg et al. | 463/42 |
| 2010/0094993 A1 | 4/2010 | Rogers et al. | |
| 2010/0131869 A1* | 5/2010 | Adachi et al. | 715/760 |
| 2010/0313078 A1 | 12/2010 | Burckart et al. | |
| 2011/0039621 A1* | 2/2011 | Steene et al. | 463/42 |
| 2011/0082911 A1* | 4/2011 | Agnoni et al. | 709/217 |

OTHER PUBLICATIONS

Non Final Office Action; mailed Dec. 7, 2009; U.S. Appl. No. 12/201,330.

Non final Office Action; mailed Mar. 24, 2010; U.S. Appl. No. 12/201,306.

"Corba Basics", http://www.omg.org/gettingstarted/corbafaq.htm; copyright 1997-2010, Object Management Group, Inc.; 4 pages.

Red Hat, Final Office Action mailed Aug. 11, 2010 for U.S. Appl. No. 12/210,306, 19 pages.

USPTO, Office Action for U.S. Appl. No. 12/201,306, mailed Feb. 28, 2013.

USPTO, Notice of Allowance for U.S. Appl. No. 12/201,306, mailed Nov. 6, 2013.

* cited by examiner

FACILITATING CLIENT SERVER INTERACTION

CROSS-REFERENCE TO RELATED APPLICATIONS

Cross-reference is made to a co-pending application by Luke Macken and Toshio Kuatomi for "Method and System for Facilitating Client Server Interaction" filed on the same date as the present application and commonly owned. The cross-referenced application is incorporated herein by reference.

TECHNICAL FIELD

Embodiments of the present invention relate to a method and system for facilitating client server communication. Specifically, the embodiments of the present invention relate to a method and system for enabling client applications to obtain data from web applications in a convenient format other than a standard web page format.

BACKGROUND

Web applications offer a diversity of functionality and data that is accessible through a standard web browser. The functionality and data are accessible through making hyper-text transfer protocol (HTTP) requests to the web applications or associated web servers. The web applications process these requests and return data in the form of hyper-text markup language (HTML) and extensible hyper-text markup language (XHTML) documents.

A programmer of a client application that does not want to merely display the returned data as a web browser would, has few desirable options to obtain the data in usable format. The programmer must code the client application to make queries specific to a particular web application. The programmer must also code the client application to parse the returned data to obtain the desired data and then reformat the data into a data structure that the client application can utilize. This coding can be time consuming and is not easily reusable as extensive additional coding has to be done to interact with each web application.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Described herein is a method and system for facilitating communication between a client and a server. The apparatus includes a base client module and a server module. The base client module receives a request for data from a client application on a client computer. The base client module then calls a method of the server module corresponding to the request. The server module determines the type of the request being received as a request for non-web page format data. The server module interacts with the logic of the web application to obtain the requested data and sends it back to the base client in a format handled by the base client. The base client can then reformat the data to a client application requested format before passing the data to the client application. This method and system allows a client application programmer to obtain easily usable data from a web application by using the base client. The web application programmer supports this system in the form of the server module by exposing the functionality of the web application for non-web page based requests. The server module functionality can be integrated with the web application to achieve this goal. The web application programmer can also provide a sub-class of the base client that provides additional or improved functionality between the web application and the base client.

Figure 1:
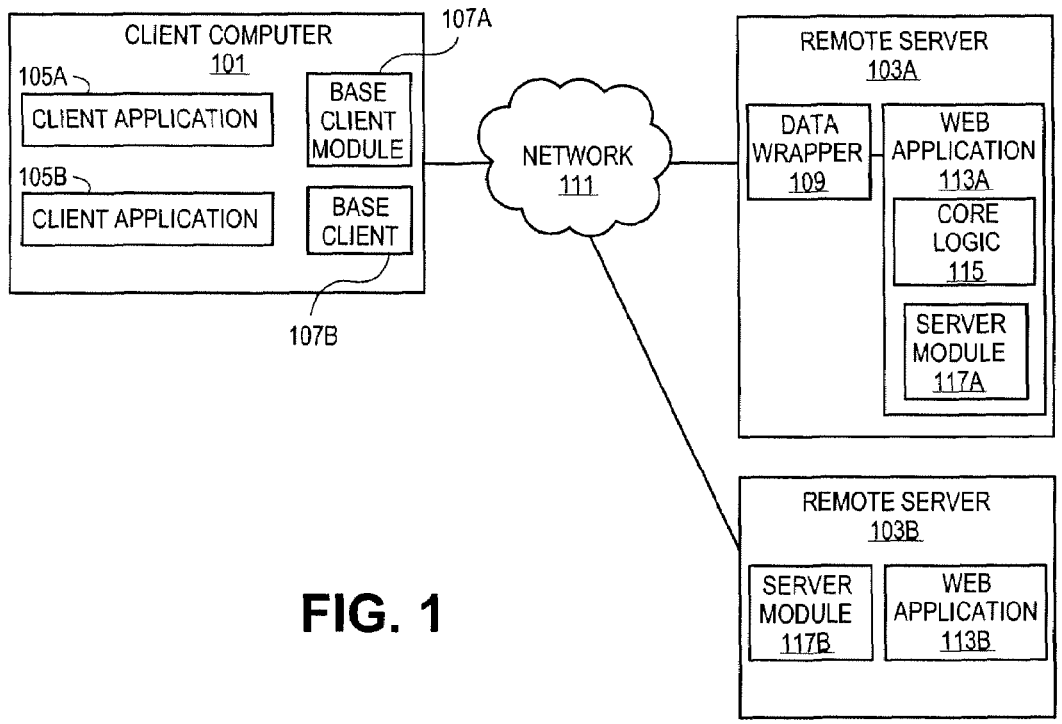
FIG. 1 is a diagram of one embodiment of a system for facilitating client server communication.

FIG. 1 is a diagram of one embodiment of a system for facilitating client server communication. The system includes a set of client computers 101 that communicate over a network 111 with a set of remote servers 113A,B. A 'set,' as used herein, refers to any whole number of items, including one item. The client computer system 101 can be any type of computing device including a desktop computer, laptop computer, handheld computer, console device, wireless device, or similar computing device. The servers 103A,B can be any type of computing device capable of executing a web application. The servers 103A,B can be desktop computers, laptop computers, dedicated servers, mainframes, console devices, wireless devices or similar computing devices. The network 111 can be any type of network including a local area network (LAN), a wide area network (WAN), such as the Internet, or any other type of network. The network 111 can be provided over any type or combination of mediums including a wired, optical, wireless or similar network architectures.

A client computer 101 includes a set of client applications 105A,B and a set of base clients 107A,B. A client application 105 A,B can be any type of application including a business application, scientific application, game application or other type of application. The client application 105 A,B utilizes a data set that is provided by a web application 113A,B. The client application 105 A,B obtains the data set from the web application 113A,B by initiating a base client module 107A,B and calling methods, procedures or similar functions of the base client module 107A,B.

The base client module 107A,B is a program that facilitates communication between the client application 105A,B and the web applications 113A,B by providing a client side mechanism for obtaining data from the web applications 113A,B in a format that is easier to utilize than the standard web page format provided by the web application (i.e., hyper-text markup language (HTML) or extensible hyper-text markup language (XHTML) formats). Further, the client programmer or web application programmer can modify the base client, for example by sub-classing a general base client class, to further process or format the data received from the web application to put it in a condition that is easy for the client application to utilize. This also simplifies the programming of the client application as it can utilize the data modeling and structures that are most efficient for its core functional purposes. Each client application 105A,B can instantiate a separate instance of a base client 107A,B. In addition, each thread or similar unit of execution for a client application 105A,B can initiate a separate base client 107A,B.

In one embodiment, each base client 107A,B is tied to a specific web application 113A,B. The base client 107A,B is provided with the uniform resource locator (URL) that identifies the associated web application 113A,B. The base client 107A,B can also be provided with a username and password for the web application 113A,B to enable authentication of a session between the respective base client 105A,B and web application 113A,B. The base client 107A,B can also authenticate with the web application 113A,B through a session identifier or similar method. In one example embodiment, the session identifier is a pseudo unique hash that identifies a user or person for a given period of time. The session identifier can be exchanged between the base client 107A,B and the web application 113A,B via a cookie or similar mechanism. Authentication can take place at the message level, such as with username/password authentication, which can be done for example through secure socket layer (SSL)/transport layer security (TLS). Authentication can also take place at other levels such as SSL client-side certificate authentication, which occurs during the connection handshake using SSL certificates. Authentication could be handled by core logic 115, server modules 117A,B or a specialized set of authentication modules. An authentication module would verify the identity of requesters before the request reaches the server modules 117A,B or core logic 115.

The remote servers 103A,B can provide any number of web applications 113A,B. The web applications 113A,B can include core logic 115 and a server module 117A or similar components. The remote servers 103A,B can also provide a separate data wrapper 109 or server module 117B. A remote server 103A,B can include any number of data wrapper 109, web applications 113,A,B and server modules 117A,B.

The web application 113A,B can provide any type of functionality or service. The core logic 115 is a component that carries out the primary functions of the web application 113A,B. The functions can include any type of calculation, database retrieval or similar function. In one embodiment, the functions operate on local data structures and databases. In another embodiment, the functions operate on remote data structures or databases or interfaces with other remote resources. Functions can include creation, deletion, editing and viewing of data from local and remote data structures and databases. Local and remote databases that can be resources managed by the functions include MySQL, SQLite, PostgreSQL and similar database systems.

The server modules 117A,B services all requests from browsers, client applications, base clients 107A,B and similar programs. In one embodiment, the server module 117A exposes the functionality of the core logic 115 to these programs. For example, base clients 107A,B can seek to create, delete, edit and view data from a database. The core logic 115 fetches the data from the database, while the server modules 117A,B and or data wrapper 109 convert the database objects into a format to be transported to the requesting client 105A,B or base client 107A,B. In another embodiment, the server module 117B interacts with the exposed functionality of the core logic of the web application. The server modules 117A,B offer methods, procedures or similar program hooks that are called by or service the requests of the browsers, base clients 107A,B or similar client applications. In one embodiment, a web application 113A,B can configure the types of requests it will service. The web application 113A,B can limit the access to a resource to browsers, base clients 107A,B or similar client applications. The web application 113A,B could also limit access to the resource to specific browsers, base clients 107A,B or similar client applications.

The server modules 117A,B determine the type of request and obtain the requisite information from the core logic 115. The type or data structure that is returned by the server modules 117A,B is dependent on the format requested by the browser, base client module 107A,B or client application. In some scenarios, the server module 117A works in conjunction with a data wrapper 119 program to provide the data in the requisite format or type. The data wrapper 119 either converts the data that is provided by or intercepted from the server module 117A into the requisite format or type before returning it to the base client 107A,B.

In another embodiment, the server module 117B is a separate application that operates as an intermediary between the base client 107A,B and the web application 113B. The server module 117B receives requests from a base client 107A,B. In some embodiments, the server module 117B handles other types of requests including web browser requests with the same exposed functionality. In other embodiments, the web application 117B handles the web browser requests and the server module 117B handles the base client requests.

In one example implementation, the web applications 113A,B are Fedora Services by Red Hat, Inc. The Fedora Services can be implemented as part of the Fedora Services Framework. Specific Fedora Services can be implemented using TurboGears by Kevin Dangoor or similar web application framework. The web applications 113A,B as well as the base client 107A,B and client applications 105A,B can be implemented using any software development environment, language, or platform.

Figure 2:
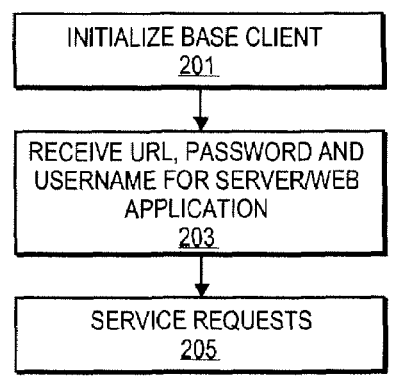
FIG. 2 is a flowchart of one embodiment of a process for initializing a base client.

FIG. 2 is a flowchart of one embodiment of a process for initializing a base client. The base client is initialized by a client application (block 201). The base client can be initialized at any point prior to a request being generated by the client application. A single client application can also initialize multiple base client modules. Separate base clients can be initialized for each thread of execution, process or similar instance of a client application. In another embodiment, the base client can service multiple processes, client applications or similar programs. In this embodiment, the base client is capable of managing multiple client applications, processes, threads or similar programs. The base client can be subclassed from a general class or other sub-classes of the base client. Sub-classes can be written to add functionality including specific modifications to and processing of the data returned from the web application to prepare it for use by the client application.

During or after initialization, the client application provides the new base client instance with identifying information for the web application to be accessed (block 203). The identifying information can be in any format and provided as an parameter or input by a user via a command line interface, graphical user interface or by hard coding. In one embodiment, the identifying information is a uniform resource locator (URL). The client application can also provide authentication information. The authentication information is information required to access or interact with a web application. The authentication information can include a username and/or password. Similarly, this data can also be provided by a user through either a command line interface or graphical user interface.

After the initialization, including the receipt of any authentication information, is completed, the new base client instance is ready to receive and service requests from the client application (block 205). The new base client instance can provide any type of feedback or response at completion of the initialization process to signal to the client application that the base client module is ready to service requests or calls from the client application.

Figure 3:
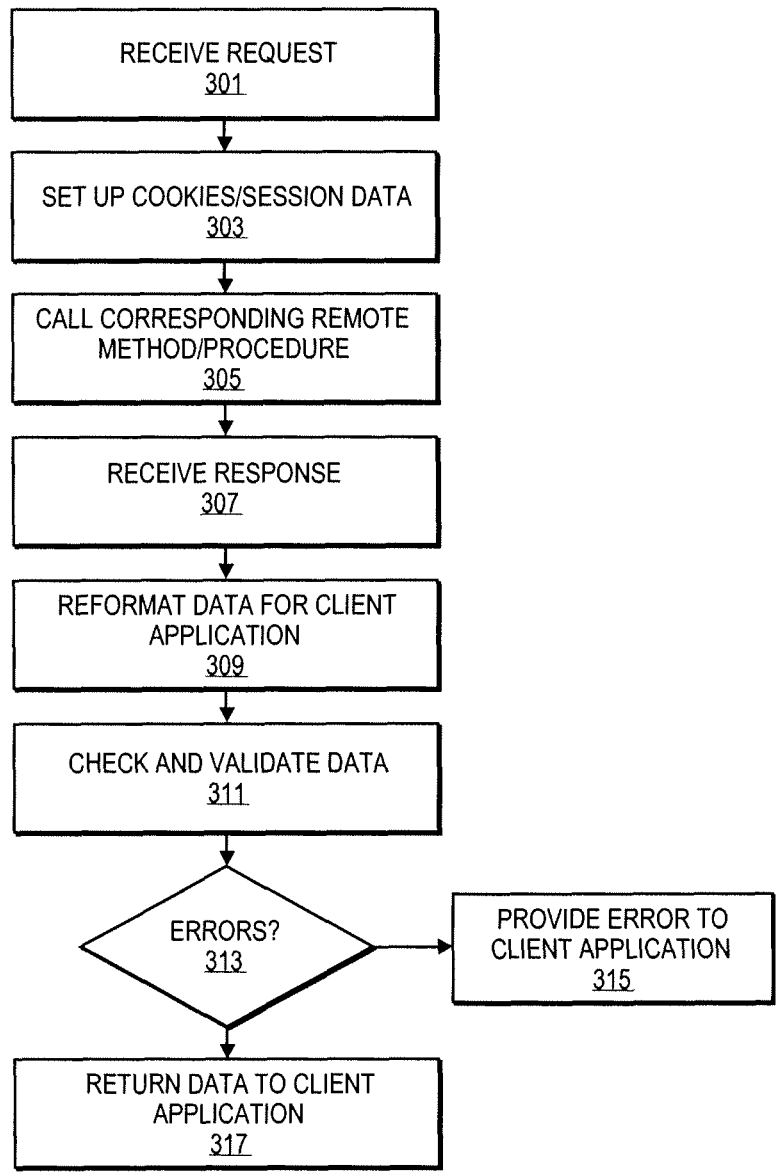
FIG. 3 is a diagram of one embodiment of a process for handling client requests by the base client.

FIG. 3 is a diagram of one embodiment of a process for handling client requests by the base client. The process is initiated in response to receiving a call or request from a client application (block 301). The request can be a persistent or non-persistent request. A persistent request remains open through out the duration of multiple individual data requests. Use of persistent requests allows a base client to initiate one request with a server that can be utilized through out the lifetime of the client program to make any number of data requests without having to initiate a new request. The user of non-persistent requests minimizes the tracking of open requests and are handled individually. The request can come in the form of a method call, procedure call or similar request. The base client can have any number of methods, procedures or similar functions that are accessible to the client application. A general class of the base client can include a minimum set of functions, while a sub-classed base client can have an expanded set of functions. In one embodiment, the functions of the base client correlate with the functions of the web application. The correlation could be a one to one correlation. In another embodiment, additional functions that process data from the web application to alter the data into a form that is more useful to the client application can also be defined.

In response to a data request from the client application, the base client establishes a session or checks for an established session with the web application (block 303). The session data can be stored in any data structure. In one embodiment, some session and related state data can be stored in a cookie or similar format. If a session does not exist or has ended then it is initiated or restarted. The initiation of the session can include authentication wherein the authentication data provided by the client application data is provided to the web application to establish the session.

The accessed function of the base client can pre-process the request data and/or initiate a corresponding request with the web application through the session (block 305). Any type of pre-processing can be defined. The pre-processing can include reformatting request data or determining parameters for a data request for the web application. The functions of the base client can have any relationship to the functions of the web application including a one to one (1:1), many to one (m:1), one to many (1:n) and/or many to many (m:n) correspondence.

The web application then processes the data request that is received from the base client in the form of a method call, procedure call or similar function call along with the parameters of such calls. The web application and/or any intermediate programs such as a data wrapper or similar program then provides a response to the data request (block 307). The response data will be in a known format. In one example implementation, the data is in the JavaScript Object Notation (JSON) format. Any type of standardized or well known data structure or format can be utilized. Responses can be streaming or non-streaming responses. If persistent requests are utilized, then the base client can open a single connection. Instead of frequently polling the server for new data, the client receives response data asynchronously as it is sent by the server. Non-streaming responses are made to specific requests and require a new request to obtain a new response.

The base client can either return the received data to the client application or further process the data (block 309). The base client can perform any type of processing on the data including reformatting the data, aggregating the data, performing calculations using the data or performing similar functions to prepare the data for use by the client application. Sub-classing of the base client can be utilized to implement specialized processing of the returned data for a client application.

A check or validation of the returned data to ensure that it was not corrupted in the transmission, corresponds to the client format or meets similar criteria can be performed (block 311). In some scenarios, the web application or intermediate program does not return the requested data. Instead, an indicator of a type of error that occurred and prevented the servicing of the request is returned to the base client. If such an indicator is detected (block 313), then the indicator or a corresponding error indicator can be returned to the client application (block 315). In many cases the type of error generated at the web application cannot be returned to the client application, e.g., exceptions cannot be passed in this way. Instead, an indicator of the exception is returned and the base client can translate this error into a type understood by the client application or instantiate the error on the client side such as with an exception to be serviced by the client application or similar program.

If no error is detected, then the requested data is returned to the client application (block 317). The entirety of the data can be returned directly to the client application or any sub-set thereof. In another embodiment, the data is not directly returned, rather it is made accessible to the client application. The reformatting or other post-processing of the data can be executed at this point instead of upon receipt or separate aspects of the post-processing can be carried out in each stage.

Figure 4:
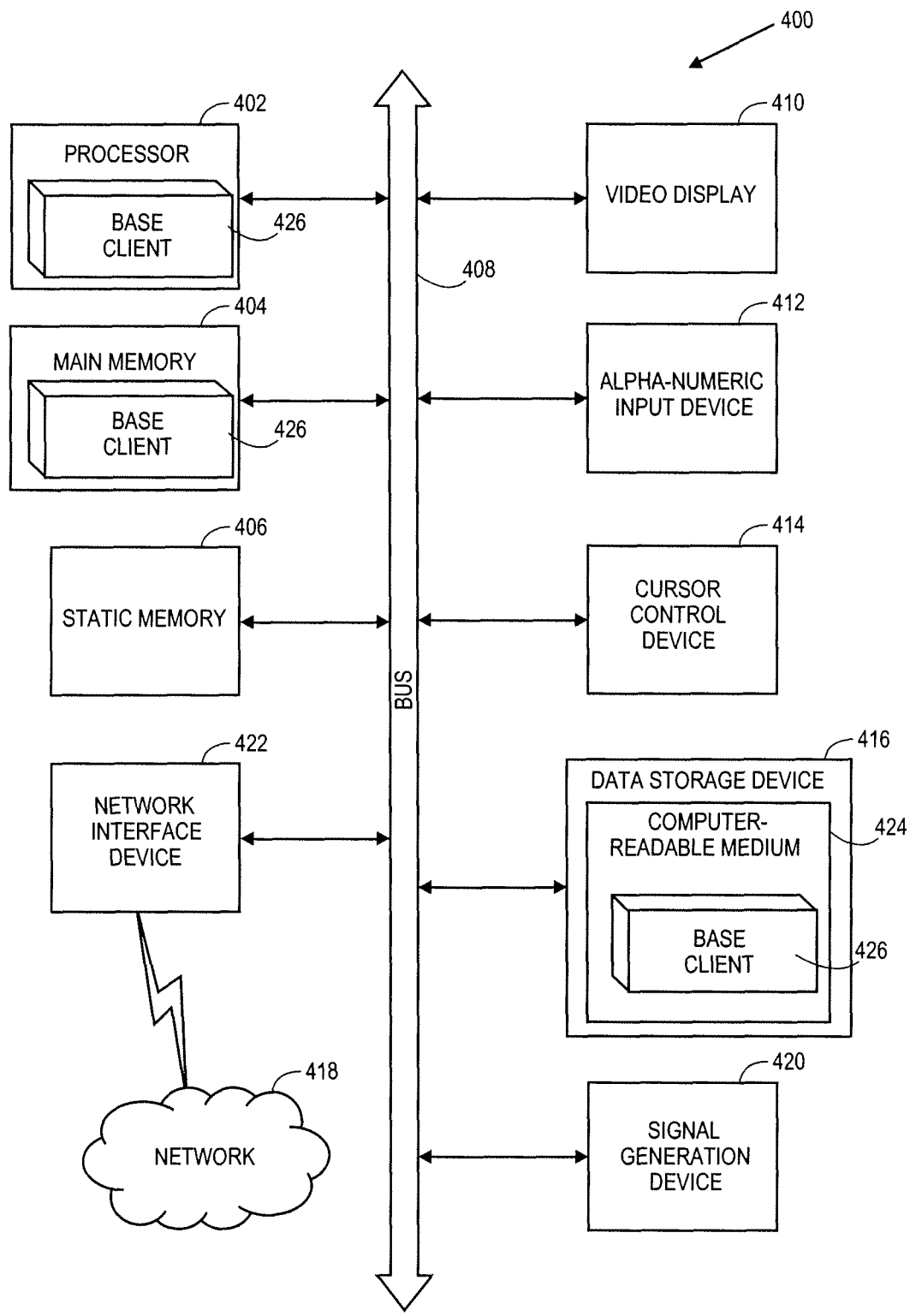
FIG. 4 is a diagram of one embodiment of a computer system for providing the base client.

FIG. 4 is a diagram of one embodiment of a computer system for providing the base client. Within the computer system 400 is a set of instructions for causing the machine to perform any one or more of the methodologies discussed herein. In alternative embodiments, the machine can be connected (e.g., networked) to other machines in a LAN, an intranet, an extranet or the Internet. The machine can operate in the capacity of a server or a client machine (e.g., a client computer executing the base client module and the server computer executing the server module) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 416 (e.g., a data storage device in the form of a drive unit, which may include fixed or removable computer-readable medium), which communicate with each other via a bus 408.

Processor 402 represents one or more general-purpose processing devices such as a microprocessor, central processing unit, or the like. More particularly, the processor 402 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 402 can also be one or more special-purpose processing devices such as an application specific integrated circuit (ASIC), a field programmable gate array (FPGA), a digital signal processor (DSP), network processor, or the like. Processor 402 is configured to execute the base client module 426 for performing the operations and steps discussed herein.

The computer system 400 can further include a network interface device 422. The computer system 400 also can include a video display unit 410 (e.g., a liquid crystal display (LCD) or a cathode ray tube (CRT)) connected to the computer system through a graphics port and graphics chipset, an alphanumeric input device 412 (e.g., a keyboard), a cursor control device 414 (e.g., a mouse), and a signal generation device 420 (e.g., a speaker).

The secondary memory 416 can include a machine-readable storage medium (or more specifically a computer-readable storage medium) 424 on which is stored one or more sets of instructions (e.g., the base client module 426) embodying any one or more of the methodologies or functions described herein. The base client module 426 can also reside, completely or at least partially, within the main memory 404 and/or within the processing device 402 during execution thereof by the computer system 400, the main memory 404 and the processing device 402 also constituting machine-readable storage media. The base client module 426 can further be transmitted or received over a network 418 via the network interface device 422.

The machine-readable storage medium 424 can also be used to store the base client module 426 persistently. While the machine-readable storage medium 424 is shown in an exemplary embodiment to be a single medium, the term "machine-readable storage medium" and also "computer-readable medium" should be taken to include a single medium or multiple media (e.g., a centralized or distributed database, and/or associated caches and servers) that store the one or more sets of instructions. The terms "machine-readable storage medium" and "computer-readable medium" shall also be taken to include any medium that is capable of storing or encoding a set of instructions for execution by the machine and that cause the machine to perform any one or more of the methodologies of the present invention. The terms "machine-readable storage medium" and "computer-readable medium" shall accordingly be taken to include, but not be limited to, solid-state memories, and optical and magnetic media.

In the above description, numerous details are set forth. It will be apparent, however, to one skilled in the art, that the present invention can be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing," "computing," "generating," "determining," "selecting," "displaying," "receiving," "updating," "modifying," "requesting," "running," "executing," "checking," "initiating," "returning," "retrieving," "identifying," "calculating," "reformatting," "outputting," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus can be specially constructed for the required purposes or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer readable medium includes any mechanism for storing information in a form readable by a computer. For example, a computer readable medium includes read only memory ("ROM"), random access memory ("RAM"), magnetic disk storage media; optical storage media, flash memory devices or other type of machine-accessible storage media.

Thus, a method and apparatus for facilitating client-server interfacing has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:
receiving a uniform resource locator identifying a web application by a base client module from a client application during initialization of the base client module by the client application, wherein the base client module is an instance exclusive to client application and specific to the web application;

receiving a first request from the client application on a client computer after initialization for data in a first non-web page format from a web application on a remote server at the base client module on the client computer;

establishing cookies for a session with the web application by the base client module;

executing a function call by the base client module in response to the first request, the function call provided by a server module of the web application, wherein the function call is communicated directly to the server module within an application layer;

receiving a response data to the function call in a Java Script Object Notation (JSON) format from the server module;

reformatting the response data into the first non-web page format for the client application by the base client module; and identifying an error indicator in the response data.

2. The method of claim 1, wherein the first request is a call to a method of the base client module.

3. The method of claim 1, further comprising:
initiating an error for the client application in response to the error indicator.

4. The method of claim 1, further comprising:
receiving authentication data for the web application during initialization of the base client module.

5. The method of claim 1, wherein the client application is implemented in Python.

6. The method of claim 1, wherein the base client module is a sub-class of a general class and provides additional processing of the result data for the client application.

7. A non-transitory computer readable storage medium, having instructions stored therein, which when executed, cause a computer to perform a set of operations comprising:

receiving a uniform resource locator identifying a web application by a base client module from a client application during initialization of the base client module by the client application, wherein the base client module is an instance exclusive to the client application and specific to the web application;

receiving a first request from the client application on a client computer after initialization for data in a first non-web page format from a web application on a remote server at the base client module on a client computer;

establishing cookies for a session with the web application by the base client module;

executing a function call by the base client module in response to the first request, the function call provided by a server module of the web application, wherein the function call is communicated directly to the server module within an application layer;

receiving a response data to the function call in a Java Script Object Notation (JSON) format from the server module;

reformatting the response data into the first non-web page format for the client application; and identifying an error indicator in the response data.

8. The non-transitory computer readable storage medium of claim 7, wherein the first request is a call to a method of the base client module.

9. The non-transitory computer readable storage medium of claim 7, having further instructions therein, which when executed, cause the computer to perform a further set of operations, further comprising:
initiating an error for the client application in response to the error indicator.

10. The non-transitory computer readable storage medium of claim 7, having further instructions therein, which when executed, cause the computer to perform a further set of operations, further comprising:
receiving authentication data for the web application during initialization of the base client module.

11. The non-transitory computer readable storage medium of claim 7, wherein the client application is implemented in Python.

12. A system comprising:
a processor;
a system memory coupled to the processor; and
a base client module to provide an interface between a remote web application and a client application executed by the processor, the interface to service data requests for the web application and to return response data in a client application format, the client application format being a non-web page format; the base client module receiving a uniform resource locator identifying the web application from the client application during initialization by the client application, wherein the base client module generates a cookie to track a session with the remote web application;

wherein the base client module is an instance exclusive to the client application and specific to the web application, wherein servicing data requests comprises executing a function call by the base client module, the function call provided by a server module of the web application, wherein the function call is communicated directly to the server module within an application layer, wherein the response data is in a Java Script Object Notation (JSON) format, and wherein the response data is reformatted from the JSON format into the client application format by the base client module; and wherein the base client module identifies an error in the response data.

13. The system of claim 12, wherein the function call is a method of the server module.

14. The system of claim 12, wherein the network processor initializes the base client module that is a sub-class of a general class and provides additional processing of the result data for the client application.

* * * * *